United States Patent Office 2,847,618
Patented Aug. 12, 1958

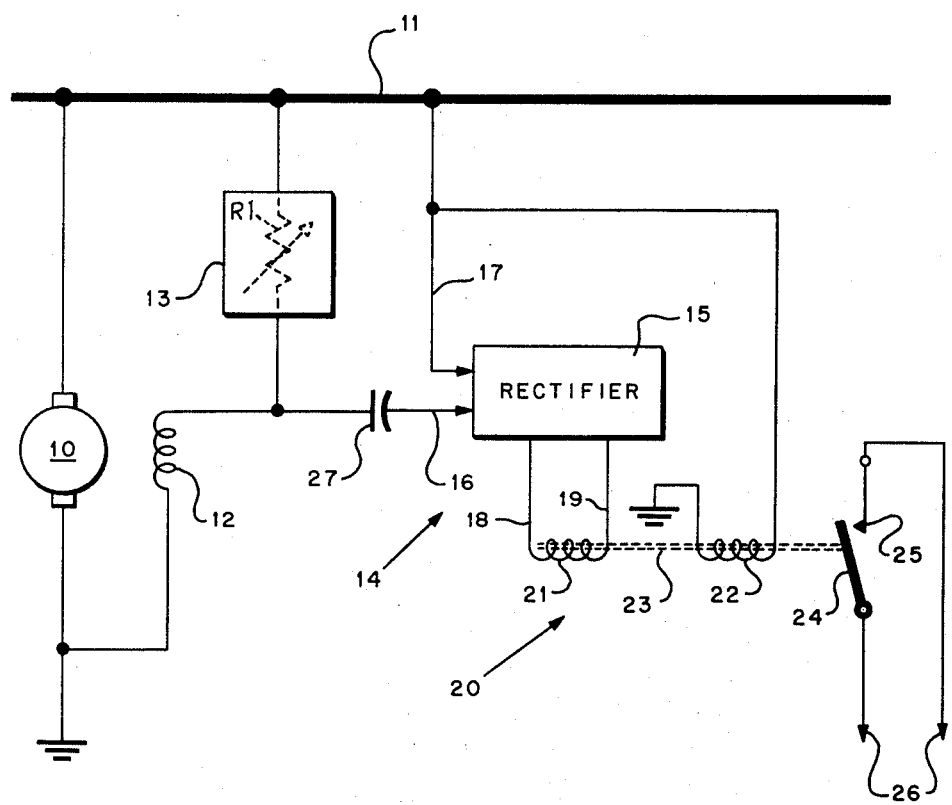

2,847,618

OVERVOLTAGE FAULT DETECTION MEANS IN ELECTRIC GENERATING SYSTEMS

Oscar Markowitz, Philadelphia, Pa.

Application August 8, 1955, Serial No. 527,184

6 Claims. (Cl. 317—13)

(Granted under Title 35, U. S. Code (1952), sec. 266)

The invention described herein may be manufactured and used by or for the Government of the United States of America for governmental purposes without the payment of any royalties thereon or therefor.

The present invention relates to overvoltage fault detection means in electric generating systems and more particularly to a means for overvoltage detection which inherently discriminates between overvoltages due to transient conditions and overvoltages due to faults in the system.

Present systems for detecting overvoltages depend on the period of time which the overvoltage remains in the system as the basis to discriminate between the overvoltage due to a fault which is continuous, and the overvoltage due to a condition which is transitory, the fault herein being set forth as an uncontrolled failure in an electrical and/or mechanical apparatus instrumental in causing a sustained overvoltage. Therefore, the overvoltage due to a fault must remain on the system for a given length of time to allow full discrimination from the transitory conditions before it can be detected, thereby allowing the overvoltage condition to rise to maximum destructive levels before protective devices are allowed to operate.

The present invention overcomes these disadvantages by discriminating between an overvoltage due to a transient condition from a sustained overvoltage long before the overvoltage has reached its maximum destructive levels. Accordingly, the inventive device is in essence an anticipatory relay having particular application in direct current power systems wherein a regulating resistance is used to maintain a constant bus voltage. The ability of the inventive device to discriminate between various types of voltages in the manner indicated above resides in recognition of the fact that a fundamental characteristic difference exists between an overvoltage as a result of a fault condition and a transient voltage due to load switching from their very inception, and the provision of discriminating means sensitive to this difference operable even before the maximum tolerable transient overvoltage is reached. In such a direct current electric generating system, the voltage of the generator is controlled by a regulator in which a regulating resistance controls the current flow through the generator field thereby controlling output voltage from the generator. When overvoltage is due to a transient condition, such as load switching, the regulating resistance changes in value in its controlling action to maintain constant output voltage. In a generating system undergoing a multiplicity of transient conditions, the voltage across the regulating resistance must continually undergo change. In addition, apart from the change in resistance due to transitory loading effects, the regulating resistance is undergoing continuous changes in resistance of an oscillatory nature notwithstanding the absence of transient voltages, since this regulating resistance is incorporated in a closed loop circuit, the operation of which is dynamic in character. Therefore, under normal conditions a voltage continuously prevails across the regulating resistance that is alternating in nature and, if this signal undergoes rectification, the resultant DC signal may be used as a bias in a sensing relay to prevent actuation thereof. Hence, for all conditions of transitory operation involving load switching, the regulator is capable of returning the bus voltage of the power system to its original predetermined value, and the bias derived from either the effects of transitory load switching or normal regulatory behavior of the regulating resistance is effective to nullify tripping action of the sensing relay. When an overvoltage occurs due to a fault, for example, which disables the voltage regulator in the system, it is apparent that such overvoltage can only be manifested as a result of excessive excitation current having been permitted to flow in the field winding of the generator. Hence, under circumstances wherein the regulator has become in effect a circuit nullity, the bus voltage undergoes an overvoltage rise which is distinct from that exhibited during transitory operations, and in this instance, failure of a biasing voltage to be maintained results in operation of the sensing relay. Therefore, before the voltage has risen to its maximum value, the sensing relay, in the absence of a nullifying bias, is actuated to thereby close contacts which effect the operation of the necessary protection devices.

It is, thus, a first object of the present invention to provide an overvoltage detection system in which overvoltages due to transient conditions are discriminated from overvoltages due to faults involving disablement of the voltage regulator in the system.

Another object is to provide an arrangement in electric generating systems for calling into operation the protection devices when a fault involving disablement of the voltage regulator in the system occurs.

A further object of the invention is the provision of an overvoltage detection device for use with each generator in a parallel arrangement of generators inherently capable of selecting the proper generator to be removed and protected.

Still another object is to provide an electrical protection device usable with DC or AC generators for ignoring overvoltages which are considered normal and are transient, and capable of recognizing a fault condition before the voltages reach maximum destruction levels.

A further object of the present invention is the provision of an overvoltage detection device with a polarized sensing relay which functions to operate protective devices when the voltage regulator ceases to function in its normal manner.

A final object of the present invention is the provision of a half or full wave bridge rectifier and a sensing relay which is biased by the output of the rectifier so that the absence of rectifier output indicates a fault condition in the regulator circuit to which the input of the rectifier is connected, thereby permitting the sensing relay to operate a switch which acts to protect the circuit involved.

The exact nature of this invention as well as other objects and advantages thereof will be readily apparent from consideration of the following specification relating to the annexed drawing in which:

The figure shows one preferred embodiment of the invention.

Referring to the drawing, wherein like reference characters designate like or corresponding parts through the view, there is shown a DC generator 10 connected between ground and a bus bar of power line 11 of the system, and having a field consisting of coil 12 and a conventional regulator 13 consisting of a regulating resistance R1, which controls the current flow through the generator field whereby the output voltage from the generator is maintained constant. Regulator 13 may be the conventional carbon pile regulator such as is shown in the patent to James, No. 2,677,076. Hence, the mechanism for actuating the regulating resistance R1 is not illustrated in detail, although it is pertinent to note that regulators of the general type indicated above are biased in a manner to oppose the force tending to change the resistance. Thus, in the absence of excitation for the actuating mechanism normally incorporated as a part of regulator 13, the regulating resistance R1 will be compressed to its minimum value by the action of a biasing spring or its equivalent. The control portion of regulator 13 is connected between the bus bar 11 and the field 12, as illustrated. The foregoing is a conventional arrangement for a DC generator with a shunt wound field. The protective device of this invention is indicated generally at 14. A conventional half wave or full wave bridge rectifier 15 may be provided with input connections 16 and 17 across regulator 13 and the output leads 18 and 19. A sensing relay 20 consisting of a bias coil 21, a main coil 22, and an iron core 23 may be used. Core 23 is connected to the contact arm 24 which in its closed position touches contact 25 thereby closing the circuit to output leads 26 which may be connected to protection devices of any type, not shown. Main coil 22 is connected between bus bar 11 and ground, and is consequently normally energized, tending to close contacts 24, 25 to complete the protective devices circuit. However, as long as bias coil 21 receives a predetermined output from rectifier 15, the effect of main coil 22 on core 23 is canceled and contact arm 24 remains in its open position. A condenser 27 in line 16 filters out the DC component from the input to rectifier 15.

The operation of this arrangement is as follows: The output of generator 10 is placed on the bus bar 11. During the normal operation of this system, the voltage regulator 13 of the variable resistance type continually fluctuates to maintain a constant voltage output of generator 10. Due to this continual variation in the voltage across the regulator 13 there is a variable voltage input to the rectifier 15 which is alternating in character, condenser 27 effectively blocking the steady state component of the voltage. This alternating voltage is rectified and applied across the bias coil 21 of sensing relay 20 in polarity opposition with the bus voltage appearing across the main coil 22, to nullify any magnetic attraction of core 23. As long as this biasing voltage is maintained across coil 21 to supply ampere-turns in opposition to the ampere-turns of main coil 22, the relay 20 is prevented from closing the contacts 24, 25 in the circuit connected to outside leads 26. During the normal operation of this generator system and the attendant imposition of loads on the system, not shown, the regulating resistance will therefore vary minutely above and below a predetermined level of bus voltage, and the bias voltage derived from the regulating resistance during normal regulatory behavior is sufficient to prevent actuation of the composite sensing relay 20.

However, during an overvoltage attributed to a system fault rendering ineffectual the normal function of regulator 13, main coil 22 in this instance produces sufficient flux to trip the relay. Specifically, such faults may be occasioned for anomalous reasons by deenergization of the solenoid controlling regulator resistance R1, as would be encountered, for example, when an open circuit occurs in the solenoid proper of the voltage regulator herein contemplated. In addition, it is of pertinence to indicate that the overvoltage sensing means of the instant invention is forthwith responsive should the fault be of a type which short circuits the regulator resistance R1. Consequently, the presence of such overvoltage necessarily stems from excessive excitation current having been permitted to flow in the shunt field winding 12 because of either the attendant collapse of the regulating resistance to an invariant minimum value due to the restraining action of the biasing spring normally employed in such conventional voltage regulators, or the anomalous appearance of a short circuit shunting the regulating resistance R1. The alternating component of voltage will thus disappear, bringing about the deenergization of bias coil 21 receiving the output from rectifier 15. Sensing relay 20, under the action of the now exclusive full flux of main coil 22 supplied from bus bar 11, will now close contacts 24, 25 as the overvoltage commences to rise exponentially, and a signal through leads 26 will be supplied to the protection devices, not illustrated, which are commonly used. It is to be observed that in the absence of the development of a biasing voltage, main coil 22 effects actuation of core 23 very early in the exponential rise of the overvoltage. Hence, the inventive device is in essence an anticipatory overvoltage sensing relay which operates substantially in advance of the rise of a voltage to levels considered deleterious to the operation of electrical equipment.

When generator 10 is connected in parallel with other generators, each provided with a device of this invention, it is apparent that in the event of an overvoltage, the generator causing the overvoltage is selected by its own sensing relay to be removed and protected. In such parallel operation the regulating resistances of the normally functioning machines will increase in unison in direct response to the presence of an overvoltage on power line 11, while conversely, the regulating resistance in the defective machine will decrease to a minimum invariant value as a result of a fault disabling the pertinent voltage regulator. Thus, the instant device is inherently selective without the use of selectivity circuits interconnecting the relays as in presently used arrangements.

It should be realized, of course, that this arrangement is not only suitable for use in a D. C. generator. For example, when the generator is of the A. C. type, the regulator 13 would be placed in the excitation circuit of the generator. Therefore, this protection system is useful wherever this type of regulator may be found. While the circuit of the inventive device is illustrated here in application with a shunt wound generator, it would be apparent to one skilled in the art that the arrangement may be extended for use in a compound generator which employs a regulating resistance in series with a shunt field winding.

It should be apparent that the foregoing disclosure relates to only a preferred embodiment of the invention and that numerous modifications or alterations may be made therein without departing from the spirit and the scope of the invention as set forth in the appended claims.

What is claimed is:

1. In an electrical generating system having a generator and a variable resistance voltage regulator, the combination with said variable resistance voltage regulator of an overvoltage detecting apparatus to discriminate between an overvoltage due to a fault in the system and an overvoltage due to transitory loading conditions comprising: a biasing network connected in shunt with said variable resistance voltage regulator, said network comprising, coupling means, rectifier means connected to said coupling means, and a bias coil connected as a unilateral load to said rectifier means; a main coil connected across the generator in polarity opposition relative to said bias coil; said main and bias coils comprising electrical actuating elements of a relay disposed in a normally open position, whereby the relay is actuated to the closed position in response to a fault of a type involving disablement of the variable resistance voltage regulator.

2. In an electrical generating system having a generator including a field coil, apparatus to discriminate between an overvoltage due to a fault in the system and an overvoltage due to transitory loading conditions, said apparatus comprising; a regulating resistance connected in series with the field coil across the generator; a biasing network connected in shunt with said regulating resistance.

said network comprising, coupling means, rectifier means connected to said coupling means, and a bias coil connected as a unilateral load to the rectifier means; a main coil connected across the generator in polarity opposition relative to said bias coil; and contacts in a normally open position series interconnected in a protective circuit, said main and bias coils comprising electrical actuating elements of a relay including said contacts, whereby a fault of a type effective to reduce the regulating resistance to an invariant minimum value effects closing of the contacts and operation of the protective circuit in advance of the rise of the overvoltage to a deleterious level.

3. The apparatus of claim 2 in which the coupling means is a substantially capacitive impedance.

4. In an electrical generating system having a generator including a field coil, overvoltage detecting apparatus to discriminate between an overvoltage due to a fault in the system and an overvoltage due to transitory loading conditions, said apparatus comprising: a regulating resistance connected in series with the field coil across the generator; a biasing network connected in shunt with said regulating resistance, said network comprising, coupling means, rectifier means connected to said coupling means, and a bias coil connected as a unilateral load to the rectifier means; and a main coil connected across the generator in polarity opposition relative to said bias coil, said main and bias coils comprising electrical actuating elements of a binary coil polarized relay, which relay includes normally open contacts interposed in a protective circuit, whereby a fault of a type effective to reduce the regulating resistance to a minimum invariant value effects closing of the contacts and operation of the protective circuit in advance of the rise of the overvoltage to a deleterious level.

5. In an electrical generating system having a generator including a shunt field coil, overvoltage detecting apparatus to discriminate between an overvoltage due to a fault in a system and an overvoltage due to transitory loading conditions, said apparatus comprising: a regulating resistance connected in series with the shunt field coil across the generator; a two terminal biasing network connected in shunt with said regulating resistance, said network comprising, a capacitor, a rectifier connected to said capacitor, and a bias coil connected as a unilateral load to said rectifier; a main coil connected across the generator in polarity opposition relative to the bias coil, and contacts in normally open position series interconnected in a protective circuit, said main and bias coils comprising electrical actuating elements of a binary coil polarized relay including said contacts, whereby a fault of a type effective to reduce the regulating resistance to an invariant minimum value effects closing of the contacts and operation of the protective circuit in advance of the rise of the overvoltage to an undesirable level.

6. In an electrical generating system having a plurality of generators operating in shunt across a common bus and including a corresponding plurality of variable resistance voltage regulators for maintaining substantially constant a generated bus voltage of said system, the combination with said variable resistance voltage regulators of a plurality of overvoltage detecting apparatus for discriminating between an overvoltage due to a fault in the system and an overvoltage due to transitory loading conditions, each of said overvoltage detecting apparatus comprising: a biasing network connected in shunt with said variable resistance voltage regulator, said network comprising, coupling means, rectifier means connected to said coupling means, and a bias coil connected as a unilateral load to said rectifier means; a main coil connected across the bus in polarity opposition relative to said bias coil; said main and bias coils together comprising electrical actuating elements of a relay disposed in a normally open position, whereby the relay is actuated to the closed position effecting selective removal of the generator when a fault associated therewith is of a type involving disablement of the variable resistance voltage regulator therefor.

References Cited in the file of this patent

UNITED STATES PATENTS

| 2,677,076 | James | Apr. 27, 1954 |
| 2,689,316 | Gillespie | Sept. 14, 1954 |
| 2,700,124 | Fritz | Jan. 18, 1955 |
| 2,710,367 | Clark | June 7, 1955 |

OTHER REFERENCES

Westinghouse Engineer, vol. 10, issue 5, pp. 212–216, September 1950.